United States Patent [19]

Yoshida et al.

[11] 4,338,014
[45] Jul. 6, 1982

[54] ELECTROMAGNETICALLY DRIVEN SHUTTER

[75] Inventors: Syozo Yoshida, Machida; Yoichi Tosaka, Shakujii, both of Japan

[73] Assignee: Canon Kabushiki Kaisha, Tokyo, Japan

[21] Appl. No.: 153,860

[22] Filed: May 28, 1980

[30] Foreign Application Priority Data

May 29, 1979 [JP] Japan .................................. 54-67161

[51] Int. Cl.³ .............................................. G03B 9/08
[52] U.S. Cl. ................................................. 354/234
[58] Field of Search ................... 354/23 D, 29, 30, 36, 354/38, 50, 51, 234, 235, 242–244, 246–249, 258, 266, 267

[56] References Cited

U.S. PATENT DOCUMENTS 4,164,370 8/1979 Kimura et al. ................. 354/234 X Primary Examiner—L. T. Hix
Assistant Examiner—William B. Perkey
Attorney, Agent, or Firm—Toren, McGeady & Stanger

[57] ABSTRACT

In the disclosed electromagnetically driven shutter, a leading shutter member and a trailing shutter member are driven by respective electromagnetic drive sources through an exposure operation and a return operation. Selector switches supply drive current from a battery to electromagnetic coils of the drive sources and control the direction of the drive current. After an exposure operation, a relay sets the switches for a return operation and resets the switches for exposure. Preferably, the relay is controlled by signals delayed by different delay times from the termination of the exposure operation so as to set the switches correctly.

5 Claims, 3 Drawing Figures

ELECTROMAGNETICALLY DRIVEN SHUTTER

BACKGROUND OF THE INVENTION

1. Field of the Invention

This invention relates to an electromagnetically driven shutter in which the exposure operation and returning operation of the shutter leading member and the shutter trailing member are performed by electromagnetic force.

2. Description of the Prior Art

Greater utilization of electronics in the camera art has made it necessary to simplify electromagnetically driven shutters of this type. Various proposals have been made for this purpose.

For example, slit exposure shutters whose leading and trailing shutter curtains form a slit opening very often actuate the leading shutter curtain and trailing shutter curtain independently of each other. To achieve this end, two separate electromagnetic devices are often used. However, it is important that the camera using the shutter be capable of employing a compact, low voltage battery of limited capacity. Therefore, the total amount of electric energy available to a shutter from a battery is restricted. In order to prolong the life of the battery, it is necessary to increase the efficiency of the shutter's electromagnetic drive source itself. Since the spare space in the interior camera of a housing is comparatively small, it is difficult to employ a large, high efficiency shutter drive. Thus, one would wish to use the highest voltage possible to obtain the strongest driving force from a smaller electromagnetic device. A great many slit exposure shutters need driving forces greater than that of ordinary lens shutters. This increases the demand made by the electromagnetic device upon the current supply.

The electric current flowing through the moving coil of the electromagnetic device must be reversed in direction as the exposure and resetting operations of the shutter alternate each other. A typical example of a conventional arrangement is shown in FIG. 1. That is, L is a coil of the electromagnetic drive device for the shutter leading member only (another coil for the shutter trailing member is not shown here). Tr1, Tr2, Tr3 and Tr4 are driving transistors of the same polarity (NPN) connected to each other to form a bridge. Ca and Cb are control signal sources for the transistors Tr1 to Tr4. When either one of terminals, a and b, is fed with an actuating signal, the corresponding control signal source produces an output or control signal of low level. +Vcc and −Vcc are positive and negative buses connected to the positive and negative terminals of a battery (not shown) respectively. With the circuit of FIG. 1, when the actuating signal is applied to the terminal, a, but not to the terminal, b, the transistors Tr1 and Tr4 are turned on, while the other transistors Tr2 and Tr3 remain off, thereby the coil L is supplied with current flowing in a direction indicated by arrow. Conversely when the terminal b is fed with the actuating signal, the transistors Tr3 and Tr2 are turned on, and the Tr1 and Tr4 are turned off, thus reversing the direction of current flow, and driving the coil L to move in the opposite direction to that when the preceding operation is carried out.

Since, in the illustrated circuit, connected across the both terminals +Vcc and −Vcc of the battery is a series circuit of the output impedances of the two transistors and the impedance of the coil L, the voltage of the battery less 2 times the voltage drop of the output circuit of the transistors is applied across the both ends of the coil L, and, therefore, the driving force exerted by the coil L is lowered by a magnitude proportional to 2 Vo. As the driving transistors constituting the drive circuit of the camera it is difficult to select ones of too high output power for employment. Therefore, since the impedances of the transistors Tr1 to Tr4 of this circuit cannot be ignored in respect to the impedance of the coil L, in order to cause a sufficient drive current to flow through the coil L, the battery voltage must be higher by the voltage drop due to these transistors.

We see again that the conventional transistorized reversible drive circuit suffers from the voltage drop due to the transistors and when supplied with current from a camera battery or like electrical power source of small capacity with a low voltage cannot produce a sufficiently large drive current, thereby giving a disadvantage that the shutter operates with the lack of stability and at a slower speed than is desired.

SUMMARY OF THE INVENTION

It is an object of the present invention to eliminate all the above-mentioned conventional drawbacks, and to provide a shutter drive control circuit arranged so that the battery is made to supply electric current directly to the moving coil and using the actuator for the current flow direction change-over switch constructed in the form of an electromagnetic relay whose impedance is almost zero.

This and other objects of the present invention will become apparent from the following detailed description of a practical embodiment thereof taken in conjunction with the accompanying drawings in which:

DESCRIPTION OF THE PREFERRED EMBODIMENT

In the following, one embodiment of the present invention is explained by reference to FIGS. 2 and 3.

Figure 1:
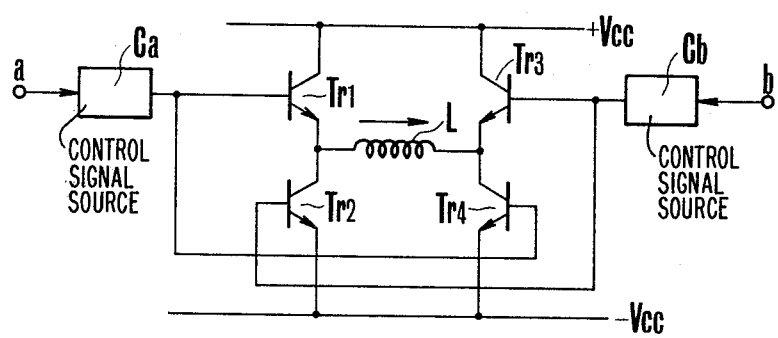
FIG. 1 is an electrical circuit diagram of a conventional electromagnetically driven shutter.
Figure 2:
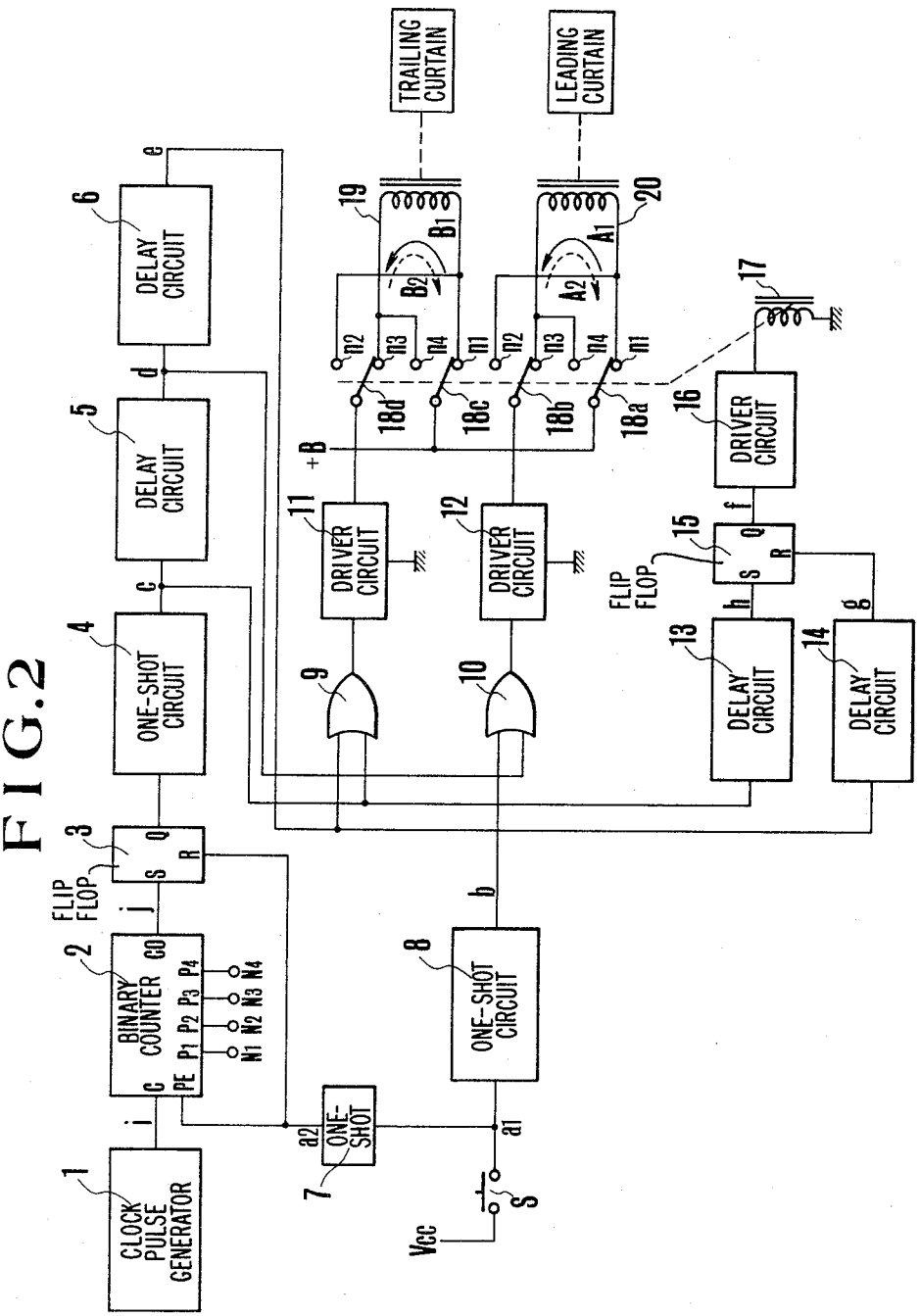
FIG. 2 is a schematic electrical circuit diagram, partly in block form, of one embodiment of an electromagnetically driven shutter according to the present invention.
Figure 3:
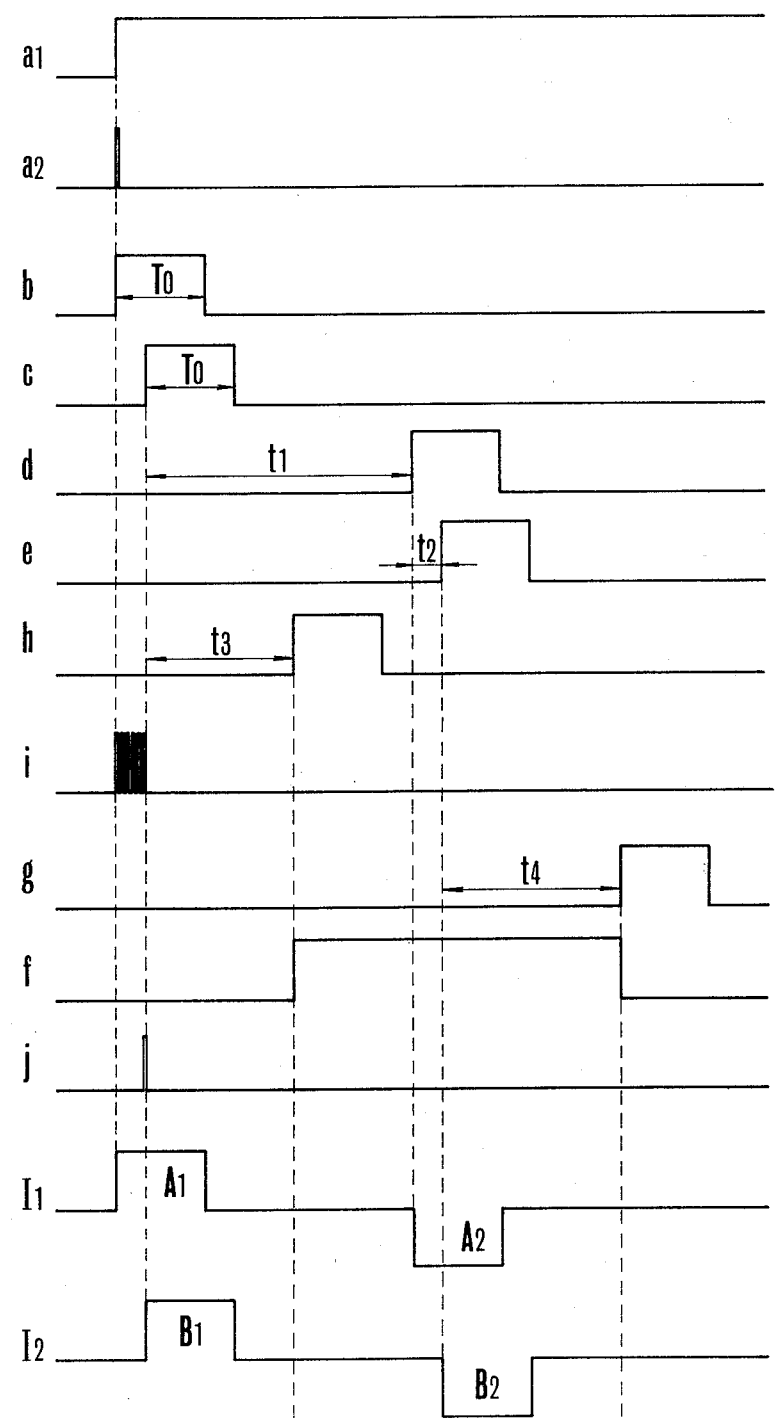
FIG. 3 is a pulse timing chart showing a manner in which the circuit of FIG. 2 may operate.

FIG. 2 discloses a drive circuit of a magnetically driven shutter. A clock pulse generator 1 produces a train of clock pulses at a constant frequency. A presettable binary counter responds to a pulse of short duration applied to a preset enable terminal PE thereof for presetting a signal from terminals N1, N2, N3 and N4 into input terminals P1, P2, P3 and P4. The binary codes of signals for application to the terminals N1, N2, N3 and N4 are listed in Table 1. Therefore, a shutter time in binary coded form is read in at the preset terminals P1, P2, P3 and P4.

TABLE 1

| P1 | P2 | P3 | P4 | Shutter Time |
|----|----|----|----|--------------|
| 1  | 0  | 0  | 0  | 1/1000 sec.  |
| 0  | 1  | 0  | 0  | 1/500        |
| 1  | 1  | 0  | 0  | 1/250        |
| 0  | 0  | 1  | 0  | 1/125        |
| 1  | 0  | 1  | 0  | 1/60         |

TABLE 1-continued

| P1 | P2 | P3 | P4 | Shutter Time |
|----|----|----|----|--------------|
| 0  | 1  | 1  | 0  | 1/30         |
| 1  | 1  | 1  | 0  | 1/15         |
| 0  | 0  | 0  | 1  | ⅛            |
| 1  | 0  | 0  | 1  | ¼            |
| 0  | 1  | 0  | 1  | ½            |
| 1  | 1  | 0  | 1  | 1            |

Element 3 is a flip-flop responsive to a carry out signal from the terminal C0 of the counter 2 to be set; 4 is a one-shot circuit responsive to the output of flip-flop 3 to be triggered; 5 is a delay circuit for delaying a signal by a time, $t_1$, from the running down of the trailing shutter curtain. A delay circuit 6 further delays the signal of the delay circuit 5 by a time, $t_2$. Member S is a release switch arranged to be closed when a release of the shutter is actuated. Element 7 is a one-shot circuit responsive to the closure of the release switch S for producing a pulse of short duration. Element 8 is one-shot circuit responsive to the closure of the release switch S for producing a leading curtain actuating signal for a predetermined time ($T_0$). Circuits 9 and 10 are OR gates; 11 and 12 are driver circuits for magnetic windings 19 and 20 controlling the operation of the trailing and leading curtains respectively. Element 13 is a delay circuit for defining a time interval from the termination of running down of the trailing curtain to the start of charge of the shutter; 15 is a flip-flop responsive to the output of the delay circuit 13 to be set; 14 is a delay circuit responsive to the completion of returning movement of the shutter for producing a signal controlling the resetting operation of the flip-flop 15. Element 16 is a driver circuit responsive to the output of the flip-flop 15 for driving a relay 17 to move. The relay 17 is arranged to actuate four change-over switches 18a, 18b, 18c and 18d controlling the direction of electric current flowing through the magnetic windings 20 and 19 for the leading and trailing shutter curtains. In more detail, the movable contacts of the change-over switches 18a and 18c are connected to the positive terminal +B of the battery. The movable contacts of the change-over switches 18b and 18d are connected to the respective outputs of the driver circuits 11 and 12 so that when the driver circuits 11 and 12 are turned on, the movable contacts of the change-over switches 18b and 18d are brought into connection with the negative terminal of the battery. Connected to each of one ends of the electromagnetic coils 19 and 20 are first and second contacts n1 and n2 which are connected in parallel to each other. Each of the opposite ends of the electromagnetic coils 19 and 20 is connected to third and fourth contacts n3 and n4 which are connected in parallel to each other. The change-over switches 18a and 18c each are comprised of the 1st and 4th contacts n1 and n4 as the fixed contacts for the switched positions, and the change-over switches 18b and 18d are comprised of the 2nd and 3rd contacts n2 and n3 as the fixed contacts for the switched positions.

The operation of the circuit of FIG. 2 will next be described by reference to FIG. 3. When a release button (not shown) is depressed, the release switch S is turned on to produce a signal of high level as shown on line $a_1$ in FIG. 3 which is applied to the one-shot circuit 7 and 8. Then, the one-shot circuit 7 produces a pulse of very short duration as shown on line $a_2$ which is applied to the terminal PE of the counter 2 and the reset terminal R of the flip-flop 3. Since the counter 2 is fed with the preset enable signal, the signal from the terminals N1, N2, N3 and N4 is preset in the input terminals P1, P2, P3 and P4. Now assuming that the signal which appeared at the terminals N1, N2, N3 and N4 represents 1/30 second in shutter time, then the input terminals P1, P2, P3 and P4 of the counter 2 take binary conditions, say, "0, 1, 1, 0" respectively. At the same time, the counter 2 starts to count clock pulses from the pulse generator 1. Also the flip-flop 3 respond to the pulse from the one-shot circuit 7 and is reset. On the other hand, the above-described one-shot circuit 8 is triggered by the high level signal resulting from the closure of the release switch S to produce a pulse of which the width is predetermined to be $T_0$ as shown on line b in FIG. 3. This pulse from the one-shot circuit 8 is applied through the OR gate 10 to the driver circuit 12, thereby the driver circuit is actuated to initiate a flowing of drive current to the magnetic winding 20 for the leading curtain of the shutter. At this time point, the relay 17 is not energized yet, and therefore the change-over switch 18a remains in the first or n1 position, and the change-over switch 18b remains in the first or n3 position, so that the electric current flows in a direction indicated by a solid line arrow A1 through the magnetic winding 20 as shown in graph I, of FIG. 3 with the result that the leading curtain LC of the shutter starts to run down. As the counting of pulses, as shown in FIG. 3, by line i, proceeds, when the number of pulses counted has reached a value corresponding to the signal [0110] given to the input terminals P1, P2, P3 and P4 of the counter 2, the counter 2 produces a carry out signal at the terminal C0 as shown on line j in FIG. 3. Thus, the time during which the counter 2 is counting the pulses, as shown in FIG. 3, by line i, is to determine the exposure time. This carry out signal from the counter 2 is applied to the set terminal S of the flip-flop 3, thereby the output at the Q stage of the flip-flop 3 is inverted from the low to the high level. This high level signal is applied to the one-shot circuit 4. Then, the one-shot circuit 4 is triggered to produce a signal of pulse width $T_0$ as shown on line c. This pulse output from the one-shot circuit 4 is applied through the OR gate 9 to the driver circuit 11, and the driver circuit 11 is turned on, causing a drive electric current to flow through the magnetic winding 19 for the trailing curtain of the shutter. Even at this time, the relay 17 is not energized yet, so that the change-over switch 18c remains in its first or n1 position, and the change-over switch 18d remains in its first or n3 position, thus initiating a flowing of electric current through the magnetic winding 19 for the trailing curtain TC of the shutter in a direction indicated by a solid line arrow B1 and is shown in graph $I_2$ of FIG. 3. After the trailing curtain of the shutter has arrived at the exposure aperture fully closed position, the delay circuit 13 produces a pulse with its rising edge delayed by a time $t_3$ from the rising edge of the output pulse $T_0$ of the one-shot circuit 4 as shown on line h in FIG. 3. This output pulse from the delay circuit 13 is applied to set the flip-flop 15 as shown in line f of FIG. 3. Therefore, the flip-flop 15 changes its output Q from the low to the high level, and this high level signal is applied to the driver circuit 16, thus actuating the relay 17 to be energized. This causes the change-over switches 18a, 18b, 18c and 18d as the relay contacts are moved to the opposite positions to those shown in FIG. 2. Then, the delay circuit 5 produces a pulse with its rising edge delayed by a time $t_1$ from the rising edge of the output pulse $T_0$ from the one-shot circuit 4 as shown on line d in FIG. 3. This pulse from the delay circuit 5 is applied through the OR gate 10 to the driver circuit 12 thereby the driver circuit 12 is turned on, causing electric current to flow through the magnetic winding 20 for the leading curtain LC. Since, at this time, the switch 18a is already changed over in the second or n4 position, and the switch 18b in the second or n2 position, the electric current flows through the winding 20 in a direction indicated by a solid line arrow A2 and by graph $I_1$ of FIG. 3, thus returning the leading curtain to the initial position. Similarly, the delay circuit 6 produces a pulse with its rising edge delayed by a time $t_2$ from the rising edge of the output pulse from the delay circuit 5 as shown on line e in FIG. 3. The output from the delay circuit 6 is applied through the OR gate 9 to turn on the driver circuit 11, thereby the magnetic winding 19 for the trailing curtain is supplied with electric current. Since, at this time, the switch 18c is already changed over in the second or n4 position, and the switch 18d in the second or n2 position, the electrical current flows in a direction indicated by a dashed line arrow B2 through the winding 19 and by graph $I_2$ of FIG. 3, thus returning the trailing curtain TC to the initial position. After such exposure operation followed by the returning operation of the leading and trailing curtains of the shutter has been completed, the delay circuit 14 produces a pulse with its rising edge delayed by a time $t_4$ from the rising edge of the output pulse from the delay circuit 6 as shown on line g in FIG. 3, and this output pulse is applied to reset the flip-flop 15, thereby the output at the stage Q of the flip-flop 15 is changed from the high to the low level. Therefore, the driver circuit is rendered inoperative to deenergize the relay 17, and the change-over switches 18a, 18b, 18c and 18d are moved to the positions illustrated in FIG. 2. Thus, all the circuit regains the initial position and is made ready to take the next exposure.

It will be appreciated that the present invention contemplates the use of relay switches in controlling the electrical power supply to the magnetic windings for the drive of the leading and trailing curtains directly from the battery with the advantage that even when the battery is of a relatively low voltage as for the incorporation in the camera housing, it is possible to attain a relatively high speed of movement of the shutter. This advantage is found to be great particularly when the size and weight of the camera is limited to a minimum.

What is claimed is:

1. An electromagnetically driven shutter apparatus for a camera comprising:
  (a) a leading shutter member and a trailing shutter member;
  (b) a first electromagnetic device for driving the leading shutter member, said device having a first electromagnetic coil;
  (c) a second electromagnetic device for driving the trailing shutter member, said device having a second electromagnetic coil;
  (d) first and second changeover switches connected to one end and an opposite end of said first electromagnetic coil, said first and said second changeover switches being switchable between a first position in which said first electromagnetic coil can be supplied with electric current flowing in one direction therethrough to effect movement of said leading shutter member for an exposure purpose, and a second position in which said first electromagnetic coil can be supplied with electric current flowing in an opposite direction therethrough to effect return movement of said leading shutter member;
  (e) third and fourth changeover switches connected to one end and an opposite end of said second electromagnetic coil, said third and fourth changeover switches being switchable between a first position in which said second electromagnetic coil can be supplied with electric current flowing in one direction therethrough to effect movement of said trailing shutter member for completion of an exposure, and a second position in which said second electromagnetic coil can be supplied with electric current flowing in an opposite direction to effect return movement of said trailing shutter member;
  (f) connecting means connectable to an electrical power source having a positive pole and a negative pole, said connector means being arranged for connecting the positive pole to said first and said third changeover switches, and connecting the negative pole to said second and said fourth changeover switches; and
  (g) a circuit arrangement, said circuit arrangement including an electromagnetic relay for controlling the movement of said changeover switches from one of said positions to the other and a control circuit responsive to the completion of an exposure for causing said relay to move the changeover switches to the second position after completion of an exposure and thereafter moving all of said changeover switches to the first position.

2. An electromagnetically driven shutter apparatus according to claim 1, wherein said control circuit includes:
  (h) a flip-flop for controlling the operation of said electromagnetic relay; and
  (i) first and second delay circuits for controlling a reset operation of said flip-flop, said first and said second delay circuits having delay times different from each other as measured from a termination of the exposure operation.

3. An electromagnetically driven shutter apparatus according to claim 1, wherein said connecting means includes:
  first and second driver circuits between said respective second and fourth changeover switches and the negative pole of the electrical power source, said circuits having controllable ON and OFF operations for supplying said first and said second electromagnetic coils with driving electric current.

4. An electromagnetically driven shutter apparatus for a camera including:
  a first electromagnetic device for driving a leading shutter member, said device having a first electromagnetic coil;
  a second electromagmetic drive for driving a trailing shutter member, said device having a second electromagnetic coil;
  first and second changeover switches shiftable between a first position in which a driving current in one direction is allowed to flow to said first electromagnetic coil for causing said leading shutter member to perform an exposure action and a second position in which a driving current in an opposite direction is allowed to flow to said first electromagnetic coil for causing said leading shutter member to perform a return action;

third and fourth changeover switches shiftable between a first position in which a driving current in one direction is allowed to flow to said second electromagnetic coil for causing said trailing shutter member to perform an exposure action and complete an exposure, and a second position in which a driving current in an opposite direction is allowed to flow to said second electromagnetic coil for causing said trailing shutter member to perform a return action;

an electromagnetic relay for each of said changeover switches, said relay being arranged to control shifting of the switches between the first and second positions thereof;

a circuit arranged to control said electromagnetic relay in such a way as to cause each of said changeover switches to shift to said second position after completion of an exposure and to further shift to said first position after shifting to the second position.

5. An electromagnetically driven shutter apparatus according to claim 4, further comprising:

a first power supply circuit for having a driving current flow to said first electromagnetic coil, said circuit being arranged to have the driving current applied to the first electromagnetic coil in response to a release signal and a return signal; and a second power supply circuit for having a driving current flow to said second electromagnetic coil, said second power supply circuit being arranged to have the driving current applied to the second electromagnetic coil in response to an exposure time count completion signal and a return signal.

* * * * *